Aug. 4, 1953 M. J. DIAMOND 2,647,628
ELECTRONIC HARDNESS SORTER
Filed May 28, 1949 3 Sheets-Sheet 1
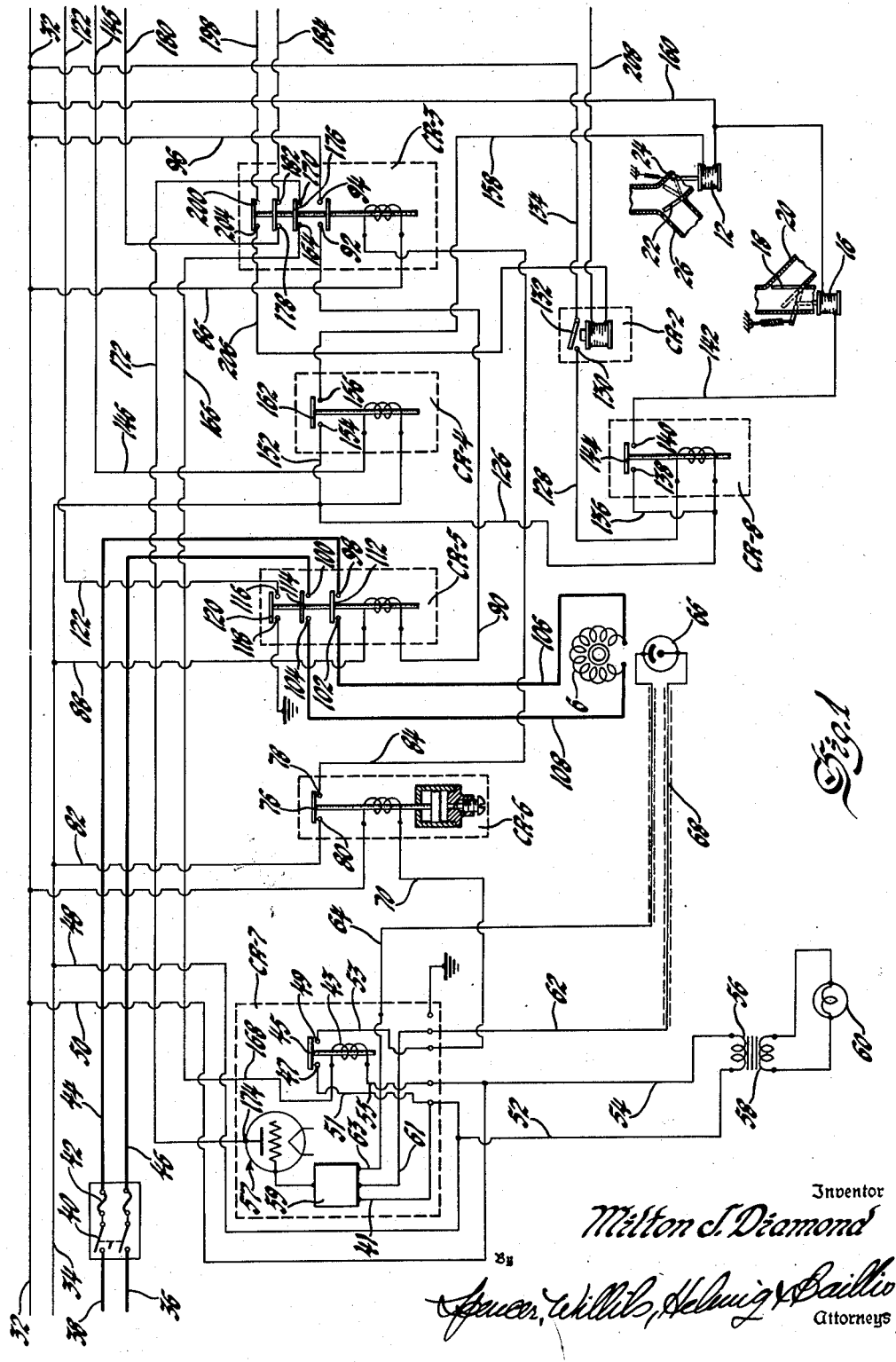
Inventor
Milton J. Diamond
By
Spencer, Willis, Helmig & Baillio
Attorneys

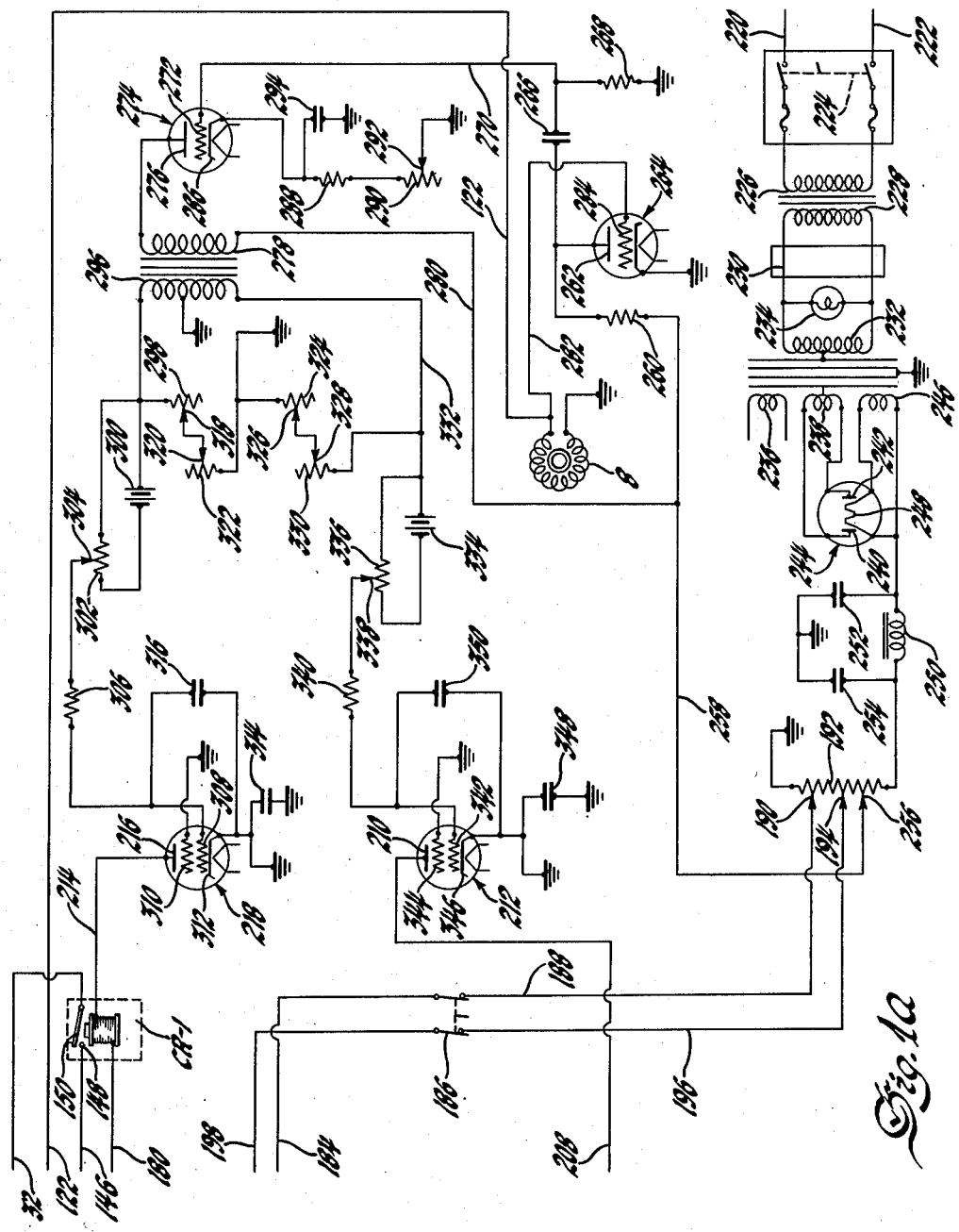

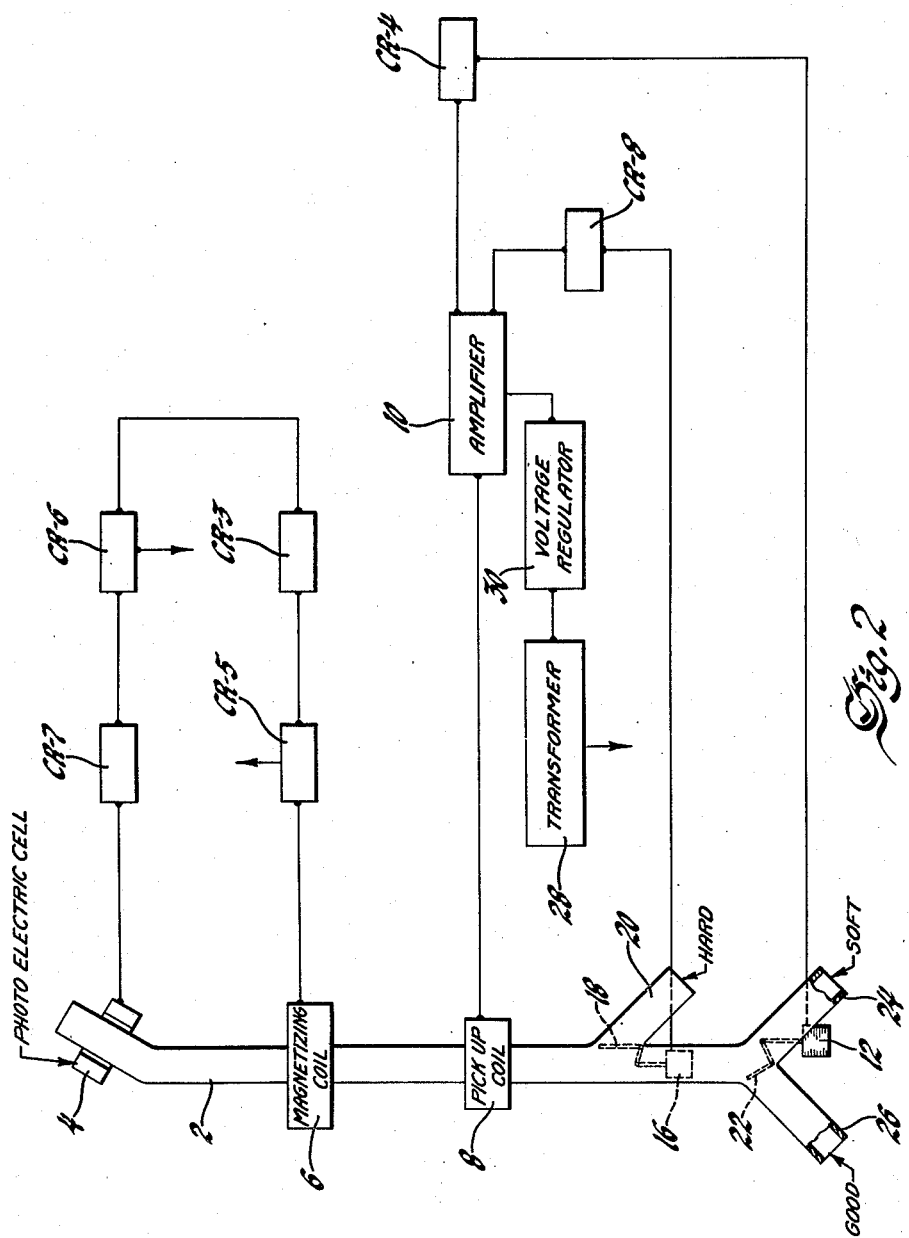

Patented Aug. 4, 1953

2,647,628

UNITED STATES PATENT OFFICE 2,647,628

ELECTRONIC HARDNESS SORTER

Milton J. Diamond, Saginaw, Mich., assignor to General Motors Corporation, Detroit, Mich., a corporation of Delaware Application May 28, 1949, Serial No. 95,900

4 Claims. (Cl. 209—81)

1

This invention relates to testing means and more specifically to nondestructive means to test a plurality of identical parts so that they may be classified into groups having uniform physical properties, such for example as hardness. Ferrous mechanical parts used in machines must, of course, fall within certain specified limits of hardness for strength, wearing characteristics, etc., and in the past it has been conventional practice to apply the Brinell hardness test manually to commercial parts as they are completed to classify those falling within the proper limits from the remainder. This is a relatively slow process and requires considerable labor and furthermore is somewhat inexact, since it provides a correct indication at only one small area on the surface of the part, which hardness may differ considerably from the hardness only a short distance away.

Some efforts have been made to utilize the magnetic properties of such ferrous parts to classify them as regards their physical properties and some of these have in various ways subjected parts to strong magnetic fields to carry the magnetization of the part above saturization, and then utilize the magnetic retentivity of the part as an indication of one of its physical characteristics. The amount of magnetism retained by a part after it has been subjected to a strong magnetic field is a function of its hardness; i. e., the more magnetism retained, the harder the part. Time is also a function, as many of these parts lose their magnetization rapidly, and, therefore, each should be tested the same period of time after the magnetizing field is removed, and this should be relatively soon after such removal, as it is desirable to have as high a test signal as possible. Where a number of identical parts are to be tested for, as an example, hardness, the residual magnetism of each part may be measured in some manner at a given time after it has been subjected to a strong magnetic field, and if the measured quantity falls within certain predetermined limits the part will be satisfactory from a hardness standpoint. The limits may be set up empirically through the use of parts whose hardness is known to give the upper and lower limits on the apparatus and the test is then merely repetitive comparison.

In general, therefore, the present system includes means for magnetizing a part above saturation, passing it in proximity to a pick-up coil to generate a voltage therein and the strength of said voltage being utilized to operate various classification sorting means which operate to direct the part to its correct final destination.

2

An object of my invention is to provide a novel classification and sorting system for magnetic members having varying degrees of hardness.

It is a further object of my invention to provide an electronic classification sorting system operative by the residual or retained magnetism of a part to sort the parts as to their hardness.

It is a still further object of my invention to provide a hardness classification system for sorting a plurality of similar parts, which system is actuated by the residual magnetism of each part.

With these and other objects in view which will become apparent as the specification proceeds, my invention will be best understood by reference to the following specification and claims and the illustrations in the accompanying drawings, in which:

Figures 1 and 1a together form the complete circuit diagrams of a system of classification embodying my invention, the interconnecting lines being designated by the same reference numeral in the two figures; and Figure 2 is a diagrammatic showing of the various interconnecting parts of my invention.

Referring now more specifically to the drawings and to Figure 2, my invention utilizes broadly the main steps of strongly magnetizing a ferrous part and then passing the same through a pick-up coil within which a current is generated and using this current to operate certain shutters or gates to conduct the part to a classified destination. In my invention I utilize a freely falling body which is introduced into a hollow tube 2 at the top where it passes between a source of light and a photocell 4 to initially trigger the control system. The impulse obtained therefrom energizes a magnetizing coil 6, which is of considerable strength so that as the part falls to the magnetizing coil the strength of the field is sufficient to support the part and to maintain it there for a short interval so that it becomes saturated. At the end of this fixed interval the field 6 is de-energized and the part, therefore, permitted to continue its fall through the tube 2, passing next in order through a pick-up coil 8 and inducing therein a current which is conducted to an amplifier indicated generally at 10, the output of said amplifier being connected to control relays CR-4 and CR-8, which relays operate magnetic shutter valves 12 and 16 respectively to vary the path of the part, depending upon its hardness characteristics. If relay CR-8 is energized to close the circuit to solenoid 16, then its shutter 18 will be thrown across the chute to direct the part out through side port 20. This will occur when the part is above the upper limit of hardness or is too hard.

On the other hand, if relay CR-4 is operated to actuate its solenoid 12, then its shutter 22 will be thrown to the right hand side, blocking off chute 24 and permitting the part to be discharged through chute 26 into the bin for satisfactory parts whose hardness falls within the predetermined limits. If neither solenoid 16 nor 12 is actuated, then the part will proceed out through chute 24 into the bin for those parts which are too soft. The amplifier 10 is supplied by suitable power from a transformer 28 and a voltage regulator 30. Suitable control relays CR-7, CR-6, CR-3 and CR-5 are shown diagrammatically as block diagrams interconnecting the photocell initiating device 4 and the magnetizing coil 6.

The specific electrical interconnection of all of these parts will now be pointed out by reference to Figures 1 and 1a, wherein input lines 32 and 34 are connected to a conventional source of 110 volt A. C. current. Input lines 36 and 38 are connected to a conventional source of 250 volt D. C. current and terminate in a double-pole switch 40, including a fuse block 42, to which are connected supply lines 44 and 46. The various control relays pointed out in Figure 2 are identified by the same numbers in Figure 1 and these include relay CR-7 at the left of Figure 1, relay CR-6 adjacent CR-7, and to the right thereof, CR-5 next in order, CR-4 further to the right, with CR-6 just below it, and lastly of this series relay CR-3. These relays provide the control and timing for the classifying system. Of this group relays CR-4 and CR-3 are controlled respectively by another pair of relays CR-1 and CR-2, which are directly operated by the output of the amplifier.

Leads 48 and 50 extend from input lines 34 and 32 respectively to terminals on relay CR-7 and have connected thereacross two additional lines 52 and 54, extending to transformer primary 56, the secondary 58 of which is connected to an indicating lamp 60. Transformer 56–58 is a step-down transformer and is used to supply the indicating lamp 60 to identify energized periods of the equipment. Lines 62 and 64 extend from terminals on relay CR-7 and connect a photoelectric cell 66 thereto. These lines are shielded as shown at 68. Relay CR-7 consists of a solenoid coil 43 actuating an armature 45 which completes the circuit between two stationary contacts 47 and 49, contact 47 being connected through line 51 to line 50 and contact 49 through line 53 to line 70 extending to relay coil CR-6. Coil 43 has one end connected to line 50 through line 55 and the opposite end connected to terminal 169. The plate of thermionic tube 57 is connected to terminal 174. The grid of this tube is connected to a connector block diagrammatically shown by the block 59, which is in turn connected through lines 61 and 63 to lines 62 and 64 respectively. Relay coil CR-6 is connected through line 70 back to contact 49 of relay CR-7, and the opposite contact is connected directly to line 48, and, upon an energization of relay CR-7 to close its armature 45, relay coil CR-6 will be energized through an obvious circuit.

The armature 76 of relay CR-6 bridges contacts 78 and 80 when in its closed position, this relay being a timed relay which will automatically open at the termination of a given time period. Contact 80 is connected through line 82 to main line 34 and contact 78 is connected through line 84 to relay coil CR-3, the opposite terminal of which is connected through line 86 to input line 32. Feed line 88 interconnects line 34 to one side of relay coil CR-5, the opposite side of which is connected through line 90 to stationary terminal 92 of relay CR-3. The associated terminal 94 of this switch is connected through line 96 to input line 32. It might be mentioned at this point that all of these relay contacts are shown in their normally de-energized positions; that is, those that are open when the relay coil is deenergized are shown open, and those closed are shown closed.

Lines 44 and 46 of the 250 volt D. C. supply are connected respectively to stationary switch contacts 98 and 100, the opposite cooperating terminals 102 and 104 respectively being connected through power lines 106 and 108 to the main magnetizing coil 6. These two switches 98–102 and 100–104 are bridged by suitable conducting armatures 112 and 114 respectively when the coil of relay CR-5 is energized. One additional switch consisting of stationary terminals 116 and 118 and conductive armature 120 is actuated by the relay CR-5. Terminal 118 is directly connected to ground, and terminal 116 is connected through conductor 122 to one side of the main pick-up coil 8, the other side of said pick-up coil being grounded.

Line 34 has connected thereto an interconnecting line 126 which extends to one side of relay coil CR-8, the opposite terminal of which is connected through line 128 to stationary terminal 130 which cooperates with movable armature 132 of relay coil CR-2, which in turn is connected through conductor 134 back to main line 32. Line 126 is also connected to conductive line 136, which terminates at stationary switch contact 138, the cooperating stationary terminal 140 of which is connected through line 142 to operating solenoid 16. Stationary contacts 138 and 140 are bridged by armature 144, actuated by the coil of control relay CR-8. Line 34 is directly connected to one side of the operating coil for relay coil CR-4, the opposite side of said coil being connected through conductive line 146 with stationary switch contact 148 of relay CR-1, the movable contact 150 of which is directly connected to line 32. Line 34 is also connected to conductive line 152 extending to stationary contact 154 of relay CR-4, the opposite stationary contact 156 of which is connected through line 158 to solenoid 12. A line 160 extends from main line 32 to the other side of the solenoid 12 and also to the other side of solenoid 16.

The armature 162 of relay CR-4 bridges the stationary contacts 154—156 to complete this circuit. Stationary contact 164 of relay CR-3 is connected through line 166 to terminal 168 on relay CR-7 and cooperating contact 170 is likewise connected back through line 172 to terminal 174 on the same relay. Contacts 164 and 170 are bridged by conductive armature 176 normally closed, and opened upon energization of coil CR-3. Terminal 178 is connected through line 180 to relay coil CR-1 and its cooperating terminal 182 is connected through line 184 to one pole of a double-pole switch 186 and thence through the cooperating stationary contact and line 188 to an adjustable tap 190 on potentiometer 192. A second adjustable tap 194 on said potentiometer is connected through line 196 with the other pole of the double-pole switch 186 and thence through line 198 back to contact 200, the cooperating stationary contact 204 of which is bridged by an armature operated by control relay CR-3, and 204 is connected by line 206 to one side of the relay coil CR-2. The opposite terminal of coil CR-2 is connected through line 208 to the plate 210 of control thermionic vacuum tube 212. In like manner the second terminal of relay coil CR-1 is connected through line 214 to plate 216 of a second control thermionic vacuum tube 218.

A third main supply line is connected across input terminals 220, 222, which are directly connected to a main double-pole switch 224 and then across the primary 226 of a power transformer. The secondary 228 of said transformer is connected first to a voltage regulator 230 (shown in block diagram), the output of which is fed into the primary 232 of a second transformer. An indicating pilot light 234 is directly connected across said primary. Primary 232 is mounted in inductive relation with a plurality of secondaries for various voltage supplies. The first secondary 236 is provided for filament current, and while not shown connected, is connected to each of the tube filaments for a power supply thereto. Second secondary coil 238 has its two terminals connected to electrodes 240 and 242 of a full wave rectifier tube 244, and the third secondary 246 is connected across the other electrodes 248 of the rectifier. The output of the rectifier is fed through a filter circuit consisting of inductance 250 and condensers 252 and 254 and then fed into the potentiometer 192 from which various taps are taken off to provide the desired voltages.

An adjustable tap 256 engaging said potentiometer 192 is connected through line 258 to one terminal of a resistor 260, the opposite side of which is directly connected to plate 262 of amplifier tube 264 and also to one side of a condenser 266. The other condenser terminal is connected to one side of a resistor 268, the opposite terminal of which is grounded, and also through line 270 to the control grid 272 of a second amplifier tube 274. Plate 276 of tube 274 is directly connected to one terminal of a transformer primary 278, the opposite terminal of which is directly connected back through line 280 to line 258. Line 122 previously mentioned is connected through tie line 282 to control grid 284 of amplifier tube 264. Cathode 286 of amplifier tube 274 is connected to a first resistor 288 and thence to a second resistor 290 in series therewith, said second resistor being provided with an adjustable tap 292 which is grounded. Condenser 294 is connected between cathode 286 and ground.

The secondary 296 of the transformer which is in inductive relation with primary 278, is center tapped to ground, and one outside terminal is directly connected to one terminal of a tapped resistor 298, one terminal of a biasing battery 300, and to one terminal of a second tapped resistor 302, the opposite side of said resistor 302 being directly connected back to the opposite battery terminal. Adjustable tap 304, which engages resistor 302, is connected through resistor 306 with the control grid 308 of tube 218. A screen grid 310 of the same tube is grounded. Cathode 312 of this tube is directly connected to ground and is likewise connected to one terminal of a condenser 314, the opposite terminal of which is grounded, and to a second condenser 316, the opposite terminal of which is connected back to the control grid 308. Adjustable tap 318 engaging resistor 298 is conductively connected with a second adjustable tap 320 engaging an additional resistor 322 which is serially connected with a further resistor 324 and also to ground. An adjustable tap 326 engaging resistor 324, is in like manner conductively connected to a second adjustable tap 328 engaging resistor 330, which is connected to line 332, which extends from the opposite terminal of secondary 296 to one terminal of a biasing cell 334.

A resistance 336 is connected directly across the biasing cell 334 and has an adjustable tap 338, which is connected through resistance 340 to the control grid 342 of tube 212. Screen grid 344 is connected to ground and cathode 346 is connected to ground and also through condenser 348 to ground and to one side of condenser 350, the opposite side of which is connected back to the control grid.

Referring now to the operation of my device, as stated previously in the application it is general that a part which is magnetized above the knee of the saturation curve retains a certain amount of magnetism, which may be referred to as residual magnetism, and this proportion will vary with the hardness of the metal. If, therefore, we can induce in some pick-up means such as a pick-up coil a current from this residual magnetism, which may be done by relative motion between the part and the coil, then the current in the coil circuit will be proportional to the hardness of the part. This current, therefore, can, through certain apparatus, operate different means, depending upon the current strength, and thus adjust guiding or sorting means to classify the parts. The part is first introduced into the upper end of tube 2, and, assuming that switches 40, 224 and 186 are closed, the passage of said part past the photocell causes coil 43 of relay CR-7 to be energized through making tube 57 conductive to complete the following circuit: line 32, line 50, line 55, coil 43, terminal 168, line 166, contact 164, armature 176 (normally closed), contact 170, line 172, terminal 174, tube 57, control circuit, line 41, line 48 to line 34. The photo cell 66 connected to the control circuit determines the biasing voltage on the control grid of tube 57 and triggers the same when a part intercepts the light falling thereon. The closure of switch 45—47—49 thus in turn closes an obvious supply circuit through relay coil CR-6 to cause its armature 76 to close, completing a third circuit through relay coil CR-3. This circuit may be traced as follows: line 34, line 82, contact 80, armature 76, contact 78, line 84, coil CR-3, line 86, line 32. Relay coil CR-3 is now energized and attracts its armature to open the three upper switches shown above and close the lowest one. One of the switches opened by this action is 164—176—170 which we have just seen is in the energizing circuit for relay CR-7 and, therefore, that relay will open, in turn opening the energizing circuit for CR-6, but it was mentioned above that this is a time delay which will remain closed for a certain predetermined time after the same is deenergized, which provides the magnetizing time for the part. Physically opening the circuit for relay CR-7 also prevents the strong magnetic field of coil 6 from affecting the tube 57. The closure of switch 92—94 completes an energizing circuit for control relay CR-5 as follows: line 32, line 96, terminal 94, armature of CR-3, terminal 92, line 90, relay coil CR-5, line 88 to line 34.

Relay CR-5 is now energized to attract its armature and to close all three switches associated therewith, the lower two 112 and 114 of which complete an obvious circuit from the main 250 volt D. C. power supply lines 44—46 to the magnetizing coil 6. This all occurs between the time that the part has passed the photocell which triggers the system and by the time it reaches a position within the magnetizing coil. The strength of the magnetic field is sufficient to support the part at this point for a predetermined length of time so that the part may become magnetically saturated. This time is determined by the characteristics of the timer relay CR–6 which, at the end of such time, opens automatically, and through the same chain of events just traced, deenergizes, first, control relay CR–3, and then relay CR–5 to open the power switch 112—114 and deenergize the magnetizing coil 6. As soon as this field is removed, of course, the part will continue its fall through the tube 2 and will next pass within the pick-up coil 8, and when it does so will induce in coil 8 voltage whose strength is proportional to the residual magnetism in the part.

This voltage is directly applied to control grid 284 of amplifier tube 264 and said tube will amplify said voltage and apply said amplified signal through plate 262 to grid 272 of the next stage of amplification. The signal is again amplified through conventional operation and applied to the primary 278 of the transformer inducing in the secondary 296 thereof an amplified signal still proportional to the residual magnetism of the part. This signal from the secondary is supplied to two thermionic tubes 218 and 212, which are adjusted to become conductive at different values by applying different biased voltages thereto, and also adjusting the various resistors in the grid circuits. It might be mentioned at this point that the pairs of adjustable resistors in each circuit are to give both fine and coarse adjustments. In other words, resistor 298 might be, for example, 5,000 ohms, to provide a rough adjustment, and the associated cooperating resistor 322 might, for example, be 500 ohms, to give a much finer adjustment. The two resistances 330 and 324 would bear the same ratio. Through the settings on these resistors as well as the setting on the potentiometers 304 and 336, the firing or conductive values of these two tubes can be very closely regulated, and are set so that tube 218 will not fire or conduct until a minimum value of signal is received. It will, of course, conduct for any values above that value. On the other hand, tube 212 is so adjusted that it will not conduct until a much higher signal is received.

Therefore, there are three stages, namely, when the signal is insufficient to make either tube conduct, a second stage where only tube 218 conducts and tube 212 remains non-conductive, and a third stage when tube 212 also conducts, both tubes then being conductive. Since relay coil CR–1 is located in the plate circuit of tube 218, when that tube becomes conductive, relay coil CR–1 is energized through the following circuit: from ground through potentiometer 192, adjustable tap 190, line 188, switch 186, line 184, stationary terminal 182, armature of CR–3, terminal 178, line 180, relay coil CR–1, line 214, plate 216, through tube 218 to cathode 312 to ground. Upon the energization of control relay CR–1, switch arm 150 closes, which in turn energizes relay coil CR–4 through an obvious circuit to cause it to attract its armature 162 to complete a circuit through solenoid gate operator 12. This circuit is as follows: line 34, line 152, contact 154, armature 162, contact 156, line 158, solenoid coil 12, line 160 to line 32. Solenoid 12 then operates to throw its shutter 22 to the dotted line position, as shown in Figures 1 and 2, to block off the right hand chute 24 and cause the part to proceed down the left hand chute 26 into the "good" bin.

If the amount of voltage induced in the pick-up coil 24 by the part is more than enough to cause tube 218 to become conductive and is sufficient to cause tube 212 to become conductive, when that occurs control relay CR–2 is energized through the following circuit: from ground through potentiometer 192, adjustable tap 194, conductor 196, switch 186, line 198, stationary terminal 200, armature of relay CR–3, terminal 204, conductor 206, relay coil CR–2, conductor 208, plate 210 of tube 212, cathode 346 to ground. Relay CR–2 then closes switch 132 controlled thereby and this completes an obvious circuit for relay coil CR–8, which in turn pulls down armature 144 and completes the supply circuit for solenoid 16. Solenoid 16, therefore, moves its gate to the dotted line position, which is across the main tube, and when the part falls will deflect it into chute 20 into a bin where the parts that are too hard are stored.

In summation, therefore, in setting up this machine a part which is just on the border line of the low limit is introduced into the mechanism and the various adjustments made until tube 218 just fires or conducts with that part inducing the signal current. A second part just below the upper limit of acceptance is then introduced and the control circuit for tube 212 is adjusted so that this tube will just conduct at that value. For example, if the hardness of the part may vary from 4.1 to 4.8 m. m. Brinell diameter (note the Brinell diameter is inversely proportional to the hardness) then the tube 218 is adjusted by using a part having a Brinell diameter of 4.7 m. m., which would be acceptable, and the control circuit for tube 212 is adjusted by using a part having a Brinell diameter of 4.2. Then after these adjustments have been made, if a part having a Brinell diameter of 4.7 or greater is dropped through the device, it will not induce enough current in the pick-up coil to energize tube 218. Neither control relay CR–1 nor CR–2 will be energized, and the part will fall through the tube 2 into chute 24 and be ejected into the bin where parts that are too soft are stored. If now a part having a Brinell diameter of let us asume 4.4 m. m. is dropped through, it will induce a sufficient signal to cause energization of tube 218 only, energizing through circuits previously traced control relay CR–1 and solenoid 12 to throw the gate operated thereby to the right and guide the part down the chute 26 into the "good" or "satisfactory" bin. If, now, a part having a Brinell diameter less than 4.2 m.m. is introduced, a still heavier signal will be induced in the pick-up coil sufficient to not only trigger tube 218, but also tube 212, in which case both relays CR–1 and CR–2 are energized, and both solenoids 12 and 16 controlled thereby. However, since the part reaches gate 18 first, it will block the remainder of the chute and conduct the part into chute 20 and whether or not the solenoid 12 is energized will make no difference. The part will then go into the "hard" bin. The signal light 60 is applied across relay CR–7 and will flash each time that relay closes to indicate to the operator that the device is operating. Otherwise a series of these parts might go through the apparatus into the "soft" bin before the operator discovered that the machine was not operating, inasmuch as no solenoids are thrown in this case.

It will thus be evident that I have provided a system for classifying identical parts which may be set up empirically and will thereafter continue selecting from a general group all of those parts having a physical characteristic falling within the limits which have been preset.

I claim:

1. In means for testing the physical characteristics of a part by the use of magnetic properties thereof, a vertical guide through which the part may fall freely along a predetermined path, switching means adjacent said path operated by the movement of the part thereby, a magnetizing coil adjacent the guide of sufficient strength to support the part from falling, timed switching means interconnecting the first-named switching means with the magnetiizng coil, to maintain the same energized for a predetermined period, a pick-up coil mounted below the magnetizing coil surrounding the guide so that when the magnetic field is removed the part is permitted to fall freely therethrough, amplifying means connected to the pick-up coil, a plurality of electronic control tubes, each biased to conduct at different values of voltage connected to the output of the amplifier, sorting means on the path of travel of the part and means for actuating said sorting means connected to each of the electronic control tubes so that the tubes control the operation of the sorting means at two different values of induced and amplified voltage to select parts falling within spaced upper and lower limits.

2. In means for testing the physical characteristics of a part, a defined channel through which the part may move, switching means at a first station on the channel, magnetic means for creating a magnetic field around the channel located at a second station spaced from the first, said switching means being connected to and controlling the operation of said magnetic means, a hollow multi-turn coil mounted at a third station along the channel and past which the part will move following the magnetic means, amplifying means connected to the coil to amplify any currents induced thertin, a plurality of thermionic means biased to conduct at different input values connected to the amplifier output, a plurality of selective solenoid gate means lastly in said channel to direct the part to different destinations, depending upon its characteristics, said solenoid gate means being connected to the thermionic means to operate when the same conduct at different values of induced input current.

3. In means for testing the physical characteristics of a part as it moves along a predetermined path, a magnetizing coil located on said path to magnetize the part as it reaches a point adjacent the same, timed switching means connected to and controlling the energizing of said coil, a pick-up coil mounted in spaced relation to said magnetizing coil but adjacent said path of movement of the part, an amplifier connected to said pick-up coil, a plurality of thermionic control tubes having plates and grids, conductive means including adjustable resistances interconnecting each grid with the amplifier output so that the tubes may be adjusted to conduct at different values thereof, and a plurality of multi-position solenoid gate means along said path, each connected in the plate circuit of one of the thermionic control tubes to be operated at said different values of induced pick-up voltage to selectively classify said parts.

4. In means for testing the physical characteristics of a part by the use of magnetic properties thereof, a vertical guide through which the part may fall freely along a predetermined path, switching means adjacent said path operated by the movement of the part thereby, a magnetizing coil adjacent the guide of sufficient strength to support the part from falling, timed switching means interconnecting the first-named switching means with the magnetizing coil, to maintain the same energized for a predetermined period, a pick-up coil mounted below the magnetizing coil surrounding the guide so that when the magnetic field is removed the part is permitted to fall freely therethrough, amplifying means connected to the pick-up coil, a plurality of differently biased electronic tubes connected to the output of the amplifier and a plurality of solenoid actuated gate means mounted in said guide and connected individually to the output circuits of the electronic tubes to selectively determine the path of the part following its movement through the pick-up coil, depending upon the magnetic retentivity of the part.

MILTON J. DIAMOND.

References Cited in the file of this patent

UNITED STATES PATENTS

| Number | Name | Date |
|---|---|---|
| 1,482,198 | Lebeis | Jan. 29, 1924 |
| 2,045,769 | Geffcken | June 30, 1930 |
| 2,280,948 | Gulliksen | Apr. 28, 1942 |
| 2,312,357 | Odquist | Mar. 2, 1943 |
| 2,352,371 | Clarke | June 27, 1944 |
| 2,427,774 | Fredrickson | Sept. 23, 1947 |
| 2,444,751 | Scott | July 6, 1948 |
| 2,455,874 | Newman | Dec. 7, 1948 |
| 2,536,693 | Okolicsanyi | Jan. 2, 1951 |

FOREIGN PATENTS

| Number | Country | Date |
|---|---|---|
| 581,964 | Great Britain | Oct. 31, 1946 |